3,208,139
METHOD OF JOINING METAL COMPONENT PARTS WITH GLASS LEADING-IN MEMBERS
Matheus Adrianus Theresias Wijburg, Mollenhutseweg, Nijmegen, Netherlands, assignor to North American Philips Company, Inc., New York, N.Y., a corporation of Delaware
No Drawing. Filed Sept. 11, 1962, Ser. No. 222,973
Claims priority, application Netherlands, Sept. 12, 1961, 269,190
2 Claims. (Cl. 29—492)

This invention relates to a method of joining metal components and to articles, the components of which are joined by this method.

The joining in a gas or vaccum-tight manner of components in which one or more metal wires are passed electrically insulated through one or more of the components, for example a glass leading-in member which is under compressive stress or a leading-in member, the material of which has a coefficient of expansion which is substantially equal to that of the metal in which it is provided, and are joined to this metal, cannot readily be performed without damaging the leading-in member.

Articles having such a structure are, for example, metal envelopes for electron tubes or semi-conductor devices, such as transistors and crystal diodes. They consist of a so-called base, on which a semi-conductor body or a system of electrodes is provided, through which base the connecting wires are passed through glass leading-in members and a metal cap or bulb which with its edge on the open side is joined in a gas or vacuum-tight manner along the circumference of the base at the side of the element or the electrode system.

It has appeared that for obtaining a joint of the present components brazing is unsuitable. Owing to the high temperature, the glass sealing may melt or the electrode system may be damaged by oxidation or the semi-conductor crystal may be damaged by diffusion. Soldering by means of lower-melting alloys results in a joint which is not resistant to higher temperatures of, for example, 300° C. Also the normal welding of the components appeared to be an unsuitable method because a glass leading-in member is very sparingly resistant to thermal shocks and uneven heat supply.

It is known to join metal components by depositing upon the components, from a chemical nickel-plating bath or electrolytically, a phosphorus-containing nickel layer, a phosphorus-cobalt layer or a phosphorus-containing nickel-cobalt alloying layer, bringing the components into the position in which they are to be joined and then heating the assembly at a temperature between 800 and 1400° C. in a protective atmosphere until substantially all the phosphorus has disappeared.

This method is also unsuitable owing to the sensitivity of the glass leading-in member to thermal shocks and the danger of oxidation of the electrode system or diffusion of foreign metals into the semi-conductor crystal. The danger also exists that the phosphorus-containing layer flows away, at the junction point, from the adjacent surface by capillary action, as a result of which the resistance to corrosion is decreased.

According to the invention, the components are joined in a gas or vacuum-tight manner by first of all covering them with a phosphorus-free layer of an alloy of nickel and cobalt, then covering them, from an electroless nickel-plating bath, with a phosphorus-containing nickel layer on the phosporus-free layer, after which the components thus covered are joined by the local supply of heat.

This joining by the local supply of heat may be carried out, for example, by resistance welding.

It has appeared that by providing in this manner a phosphorus-free cobalt layer with on top a phosphorus-containing nickel layer of low melting point and the local supply of heat an excellent joint of the components is obtained, the glass leading-in member being not damaged. It has appeared of importance that the heat which is supplied in resistance welding is not consumed for a considerable part by the base metal of the components. It has appeared that a layer of a phosphorus-free alloy of nickel-cobalt has a high electric resistance and a low heat conductivity in combination with a satisfactory corrosion resistance as compared with the known phosphorus-containing nickel or cobalt which is provided on the base metal.

According to the invention a Ni-Co layer is preferably applied, the composition of which lies between the limits Ni 40%, Co 60% and Ni 60%, Co 40%, preferably Ni 50% and Co 50%. The application of the Ni-Co layer may be carried out in known manner by electrodeposition.

A further advantage of the use of a Ni-Co layer according to the invention is that the Ni-Co gives an excellent glass adherence. The sealing of the glass leading-in member with current conductors passed through them should be carried out after application of the nickel-cobalt layer after which the phosphorus-containing nickel layer is provided on it.

Because the phosphorus-free layer has a low heat conductivity as compared with the normal base material of the components and the melting point of the phosphorus-containing nickel layer is rather low (approximately 800° C.) a comparatively small quantity of energy is required for joining the components.

What is claimed is:
1. A method of joining metal components at least one of which is in heat transfer relationship to a thermally sensitive element comprising the steps, electro-depositing a layer of a low heat-conductivity phosphorus-free nickel-cobalt alloy on opposing surfaces of the components to be joined, depositing a layer of phosphorus-containing nickel from an electroless nickel plating bath on the layer of phosphorus-free nickel-cobalt alloy, and joining the so-coated surfaces by resistance welding.

2. A method of joining metal components at least one of which is in heat transfer relationship to a thermally sensitive element comprising the steps, electro-depositing a layer of a low heat-conductivity phosphorus-free alloy of 40 to 60% of nickel and the balance cobalt on opposing surfaces of the components, depositing a layer of phosphorus-containing nickel from an electroless nickel plating bath over the layer of the nickel-cobalt alloy, and joining the so-coated surfaces by resistance welding.

References Cited by the Examiner
UNITED STATES PATENTS

| | | | |
|---|---|---|---|
| 2,071,597 | 2/37 | Vasselli | 29—482 X |
| 2,162,234 | 6/39 | Thomas. | |
| 2,795,040 | 6/57 | Antel et al. | 29—502 X |
| 2,819,381 | 1/58 | Lindow et al. | 219—92 X |
| 3,065,535 | 11/62 | Crehan et al. | 29—484 |

JOHN F. CAMPBELL, Primary Examiner.